No. 837,273. PATENTED DEC. 4, 1906.
G. O. ANGELL.
FURNACE FOR SULFATING ZINC BEARING ORES.
APPLICATION FILED DEC. 30, 1904. RENEWED MAR. 26, 1906.

2 SHEETS—SHEET 1.

WITNESSES:

INVENTOR
George O. Angell
BY
ATTORNEY.

No. 837,273. PATENTED DEC. 4, 1906.
G. O. ANGELL.
FURNACE FOR SULFATING ZINC BEARING ORES.
APPLICATION FILED DEC. 30, 1904. RENEWED MAR. 26, 1906.

2 SHEETS—SHEET 2.

UNITED STATES PATENT OFFICE.

GEORGE O. ANGELL, OF PHILADELPHIA, PENNSYLVANIA.

FURNACE FOR SULFATING ZINC-BEARING ORES.

No. 837,273.           Specification of Letters Patent.           Patented Dec. 4, 1906.

Application filed December 30, 1904. Renewed March 26, 1906. Serial No. 307,988.

*To all whom it may concern:*

Be it known that I, GEORGE O. ANGELL, a citizen of the United States, residing in the city of Philadelphia, State of Pennsylvania, have invented a certain new and useful Furnace for Sulfating Zinc-Bearing Ores, of which the following is a full, clear, and exact description, reference being had to the accompanying drawings, forming a part of this specification.

My invention relates generally to furnaces for treating ores, and specifically to a furnace for sulfating zinc-bearing ores.

It has for its object to carry out expeditiously and with great certainty a new process invented by me for producing soluble sulfates direct from zinciferous ores which are sulfid blends; and the primary object sought in the newly-invented furnace hereinafter described is the roasting of the ore to produce the sulfates in such manner that the sulfates so formed will not be broken up or resolved into oxids after the sulfate-forming stage in the treatment has been reached, this being effected primarily by a furnace capable of being substantially closed after the roasting has proceeded so far as to cause the ore to give off and ignite its constituent sulfur gases and then by the admission of air and steam into the roasting-chamber to cause the ore sulfids to be sulfated by the sulfur dioxid and trioxid thus primarily obtained. For effecting this result my invention consists of the device hereinafter described and claimed.

Figure 1:
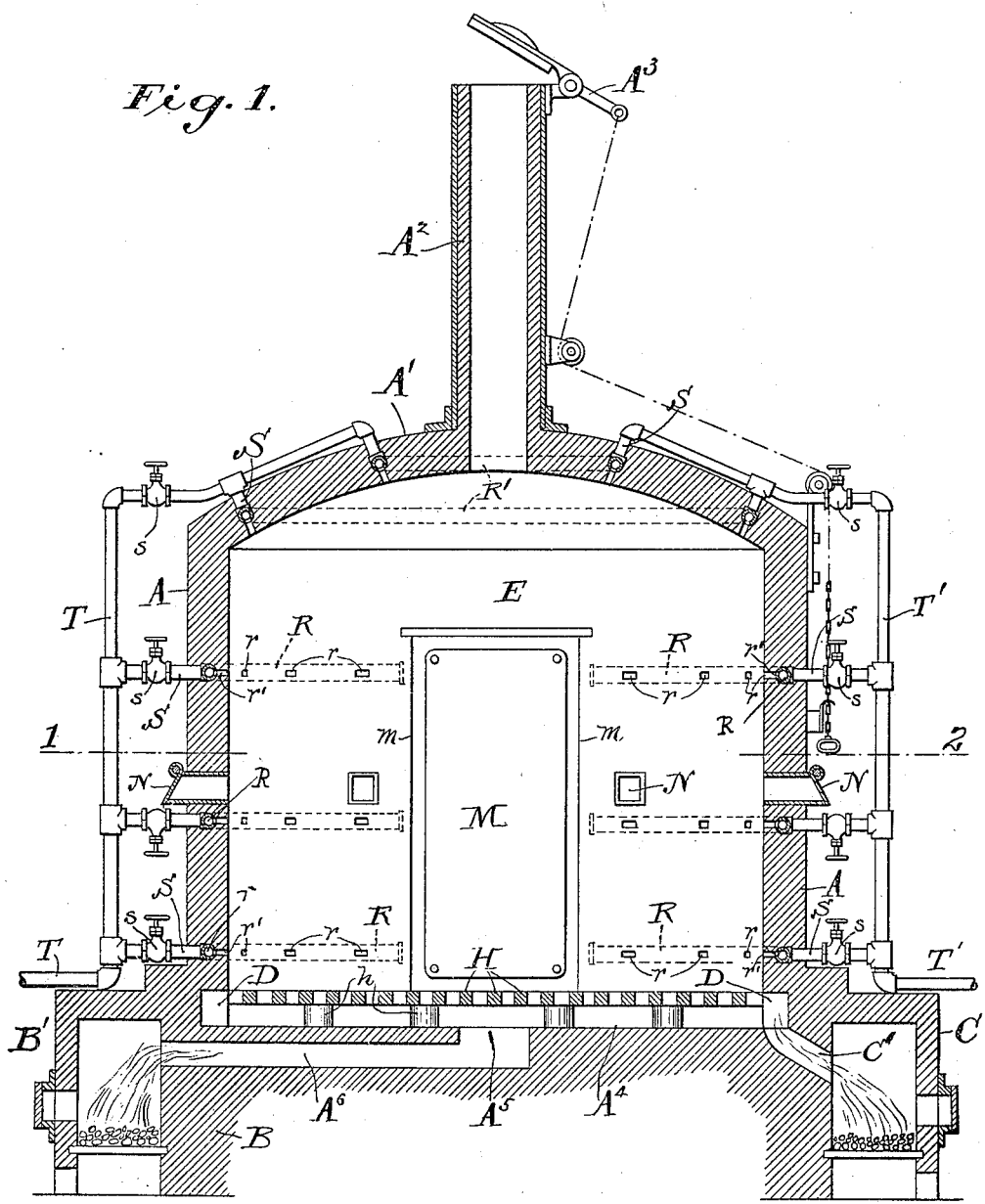
Figure 2:
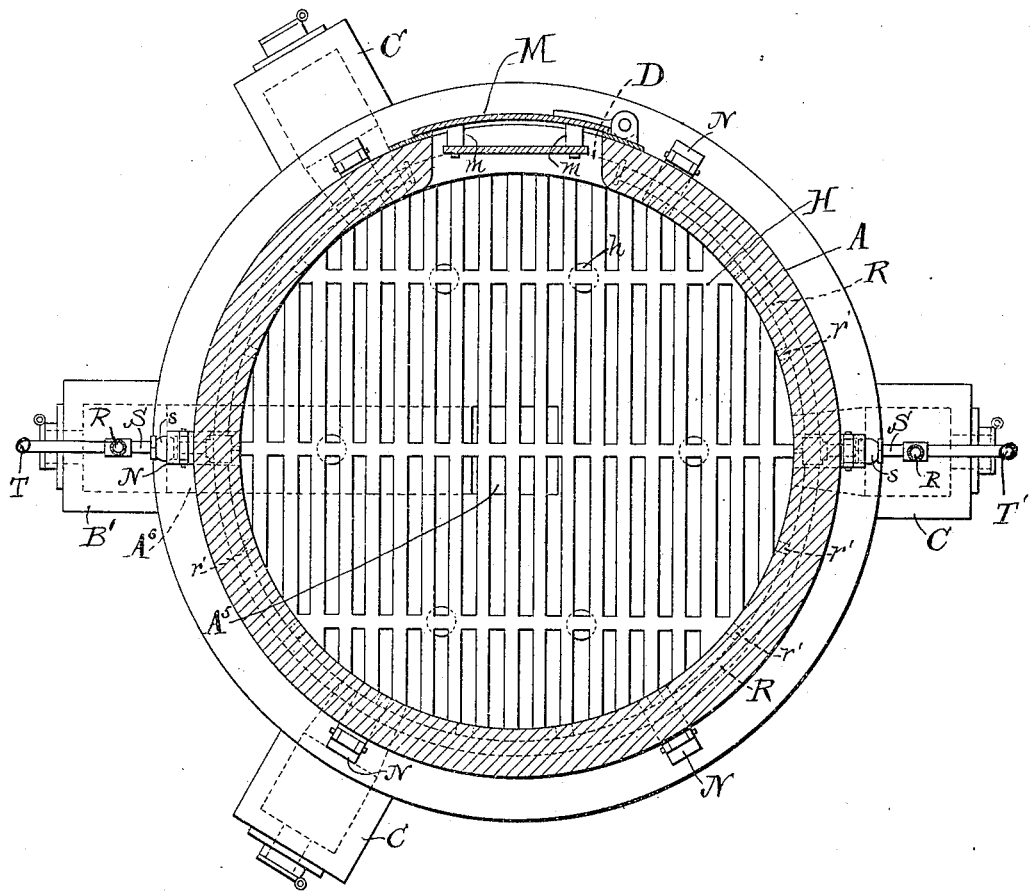

In the accompanying drawings, Figure 1 is a vertical section through a furnace constructed to embody the several features of my invention, and Fig. 2 is a lateral section through the line 1 2 of Fig. 1.

Referring now to the drawings, A represents a circular furnace, of brick, with a closed top A', having a central flue $A^2$, controlled by a damper $A^3$. The base B of the furnace is of solid brickwork, provided with the flue-passages hereinafter described, and is preferably of diameter slightly larger than the furnace-body A and provided thereat with a projecting series of fire-boxes C at suitable intervals and another such fire-box B' of like character and location. In the cross-section, Fig. 2, one such fire-box B' is shown and three such fire-boxes C in the series.

The inclosing brick walls of the furnace proper form a roasting and sulfating chamber E, and it performs the primary essential function of roasting the ore in the first step of the process. This furnace is provided with a centrally-disposed flue $A^2$, proceeding from its cover-wall A', and this flue is governed by a damper $A^3$. At the basal floor $A^4$ of the furnace is provided a flue-passage $A^5$, preferably in vertical alinement with the overhead dampered flue $A^2$, and said basal flue-passage $A^5$ communicates directly by a lateral flue-passage $A^6$ in the basal wall of the furnace with the single fire-box B'. Other similar fire-boxes C are built into the annularly-projecting base-wall of the furnace at suitable intervals. In Fig. 2 three such fire-boxes are shown. They each communicate by a flue C' to the interior of the furnace, though not directly, but through an annular flue-chamber D, let into the vertical wall A of the furnace at its conjunction with the base or floor $A^4$, upon which the grate H, supported upon short pillars $h$, rests, the grate being of a size to snugly fit the roasting-chamber above the annular flue D, the result of which is that the flame and hot products of combustion will have a more or less circuitous path to travel and prevent them striking too directly the body of ore resting on the grate. Entrance to the roasting-chamber of the furnace for charging and discharging the ore is provided by means of a door M, let into the wall, with suitable lining-plate $m$ transversely in the passage in the wall on which the door may be hung.

Peep-holes N should be provided in the furnace-wall in the region of the roasting-chamber to enable the operation of the furnace to be easily inspected from time to time during the roasting and sulfating. Embedded in the vertical wall A of the furnace is a pipe or series of pipe R, shown as three in number. A like piping R' is contained in the capping-wall A' of the furnace. The drawings show two such pipes. These pipes are closed at each end where they end on each side of the door M. These pipes are punctured with a series of small holes $r$, arranged opposite to interstices $r'$ in the wall of the furnace, so as to discharge air and steam, or either, into the roasting-chamber of the furnace. Said holes $r$ should vary in size, the smaller being opposite the point where the supply of air or steam is admitted. Such supply is admitted through short end pipes S, which are fitted into suitable openings in the said radial pipes R. Said pipes S are governed by valve-cocks $s$ and are fitted to initial supply-pipes T T', arranged on opposite sides of the furnace, one of these initial supply-pipes being used for the admission of steam and the other for supplying a current of air to the roasting-chamber.

The operation of the device is as follows: The ore being ground and preferably united with a heat-resisting binder, such as clay, to form bricks or briquets, the roasting-chamber is charged through the door M and the passage governed thereby. The fire-boxes of the furnace being started, the heated products of combustion will be drawn through the flue-like passages to the roasting-chamber E, through the grate H to and out of the overhead stack $A^2$, and when the damper $A^3$ is opened wide then through the central flue $A^5$, so as to pass a portion of the heat centrally through the roasting-chamber E. The peep-holes N enable the operator to observe the progress of the operation from time to time. The pipes R and their adjunctive tubular connections enable air to be supplied through pipe T to the roasting-chamber E primarily for the purpose of supplying oxygen; secondarily, to regulate the temperature within said chamber. The same series of pipes R are employed to admit steam through the initial supply-pipe T'. Said perforated pipes R being separate from each other in the series, any one can be brought into action to discharge air or steam to any particular part of the roasting-chamber, as may be desired. At the outstart the damper $A^3$ should be thrown wide open, so that all the draft-flues shall be brought into use. Indeed the damper $A^3$ should never be wholly closed, but should be so far closed after sulfating begins as to make the roasting-chamber substantially a closed chamber to retain more or less of the sulfur-gases. Excess of sulfur-gases in the chamber E are thus drawn off through the stack $A^2$ without diminishing the quantity thereof required in the roasting-chamber. After three to five hours of such operation the blue flame emitted will indicate that the temperature has risen high enough and been continued long enough to evolve and ignite sulfur-gases constituent in the roasting ore, whereupon the fires should be damped or the temperature materially lowered by the addition of air or steam, or both, to the roasting-chamber, though previous thereto air should be admitted to the chamber in sufficient quantities to supply the requisite oxygen needed.

The principle of the operation of the furnace is that the ores being roasted in a closed chamber in the presence of a confined volume of supplied oxygen the sulfur-gases driven off from the ore by the continued heat will directly convert the zinc and copper ore sulfids into soluble sulfates, which, due to the contained atmosphere of steam and air with the sulfur-gases in saturation due to the steam, are not broken up or resolved into oxids. If the ore submitted to treatment is so very pure as to be lacking in the average quantity of iron pyrites usually present in such ores, iron pyrites should be added to the charge of ore to supply enough gaseous sulfur dioxid and trioxid to completely convert the whole of the zinciferous ore in the charge. It is preferable to raise the heat slowly and prolong it sufficiently to form iron sulfate from the pyrites present or added, the iron sulfate being decomposed by the prolonged heat giving off its constituent sulfur oxids.

Control of the temperature is perfect by the means described, and this is essential to success, as too high a heat is apt to injure the apparatus and melt the sulfids present, the latter temperature being well known. Moreover, the regulation of the temperature by the admission of air and steam in the substantially closed roasting-chamber during the sulfating step so operates on the zinc oxid that as soon as formed by the burning off of the sulfur it is acted upon by the sulfuric anhydrid present and converted into zinc sulfate; but the air performs another function—namely, it ignites the sulfur gases given off from the zinc and other ores present and burns it, preferably in the presence of admitted steam, the heat given off being used to carry on the oxidation. Sulfuric anhydrid is plentifully formed from the sulfurous acid from the burning sulfur in contact with hot oxids and steam. Where the ore used contains lead and iron sulfids, they are first converted by treatment in this furnace into oxids and sulfates; but the heat is raised and prolonged sufficiently to break up the sulfate of iron, forming ferric oxid and sulfuric anhydrid. The ultimate result of the roasting and sulfating is the production of soluble zinc sulfate direct from the ore, from which the separation out of the contained pure zinc sulfate crystals from the mass may then be effected by dissolving the product in water and evaporating the solution.

Having thus described my invention, I claim as new and desire to secure by Letters Patent—

1. A furnace for roasting and sulfating zinciferous ores, comprising a chamber adapted to operate primarily as a roasting-chamber, and secondarily as a sulfating-chamber by means to effect the conservation therein of the sulfur-gases arising from the roasted "blende;" said chamber consisting of a basal floor, an upright inclosing wall and an over-top cover therefor with a draft-stack therein, a series of annularly-arranged perforated tubes in said upright inclosing wall, with transversely-disposed passage-ways in the latter leading from said perforated tubes to the interior of said chamber, for the admission of steam and air thereto, tubular means exterior of the chamber, adapted to lead air and steam to said perforated tubes in the upright inclosing wall, flues leading to said chamber from the base of the furnace, and fire-boxes communicating with said flues.

2. A furnace for roasting and sulfating zinciferous ores, comprising a furnace proper provided with an interior chamber adapted to operate primarily as a roasting-chamber and secondarily as a sulfating-chamber; means to control the draft through the same; means to support a body of ore above the floor of said chamber, an annular flue in the wall of the furnace at the base of the roasting-chamber and opening directly therein, basal fire-boxes with flues leading therefrom to said annular flue; a flue leading from one of said fire-boxes to the basal center of the roasting-chamber, a charging and discharging passage-way and door therefor in the furnace-wall, communicating directly with the roasting-chamber, and tubular means to supply air and steam to said chamber, with means to govern the same.

3. In a furnace for roasting and sulfating zinciferous ores, comprising a furnace proper providing fire-boxes and flues and an interior roasting and sulfating chamber into which said flues discharge, with means to control the draft through said chamber, of a series of perforated tubes embedded in the walls of the furnace, passages in said walls through which said tubes discharge into the chamber, tubes communicating with said perforated tubes and extending outside the furnace-wall, steam and air supply pipes connected to each of said tubes projecting through the furnace-wall, with means to govern said initial air and steam supply pipes.

4. A furnace for roasting and sulfating zinciferous ore sulfids, for the production, direct from the ore, of soluble zinc sulfate, comprising the following elements, namely basal fire-boxes, and over the same a solid base or flooring, an upright inclosing wall forming a roasting and sulfating chamber, an annular recess at the base of the latter, forming an inset flue-passage therein opening directly into the said chamber, flue-passages leading from the fire-boxes to said annular inset flue-passage, an overhead top wall with a central opening therein, an overhead draft-stack in said opening, means to govern the same; a series of perforated tubes embedded in the upright wall of the furnace, passages in said wall with which said perforated tubes communicate, and tubular means to supply air and steam to said perforated tubes.

In testimony whereof I have hereunto affixed my signature this 24th day of October, A. D. 1904.

GEORGE O. ANGELL.

Witnesses:
   CHAS. W. MILLER,
   GEO. A. JENNES.